(12) United States Patent
Zhang et al.

(10) Patent No.: US 11,847,539 B2
(45) Date of Patent: Dec. 19, 2023

(54) DEPLOY BUILD BLOCKS AND ANALYZE BUILD BOTTLENECK

(71) Applicant: International Business Machines Corporation, Armonk, NY (US)

(72) Inventors: Ning Zhang, Xi'an (CN); Yi Shao, Xi'an (CN); Jing Xu, Xi'an (CN); Xue Ying Zhang, Xi'an (CN); Na Zhao, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 302 days.

(21) Appl. No.: 17/370,071

(22) Filed: Jul. 8, 2021

(65) Prior Publication Data
US 2023/0011835 A1    Jan. 12, 2023

(51) Int. Cl.
G06F 9/44    (2018.01)
G06N 20/00   (2019.01)
G06N 5/04    (2023.01)

(52) U.S. Cl.
CPC .............. *G06N 20/00* (2019.01); *G06N 5/04* (2013.01)

(58) Field of Classification Search
CPC   G06N 3/02; G06N 3/08; G06N 20/00; G06N 5/04

USPC .................................................. 717/101–109
See application file for complete search history.

(56) References Cited

U.S. PATENT DOCUMENTS

| | | | |
|---|---|---|---|
| 9,612,821 B2 | 1/2017 | Iyer | |
| 2016/0357660 A1 | 12/2016 | Dean | |
| 2018/0239949 A1* | 8/2018 | Chander | G06F 18/214 |
| 2019/0102840 A1* | 4/2019 | Perl | G06Q 40/08 |
| 2019/0294484 A1 | 9/2019 | Luo | |
| 2020/0089485 A1 | 3/2020 | Sobran | |

FOREIGN PATENT DOCUMENTS

CN    111581104 A    8/2020

* cited by examiner

*Primary Examiner* — Chuck O Kendall
(74) *Attorney, Agent, or Firm* — Van Leeuwen & Van Leeuwen; Matthew C. Zehrer (57) ABSTRACT

An approach is provided in which the approach trains a first machine learning model using a set of features corresponding to a set of build blocks. The set of build blocks include at least one dependency build block and at least one artifact package build block. The approach predicts a set of risk values of the set of build blocks using the trained first machine learning model, and marks at least one of the build blocks as a bottleneck in response to comparing the set of risk values against a risk threshold.

20 Claims, 10 Drawing Sheets

| BUILD BLOCK FEATURES TABLE 600 | | |
|---|---|---|
| CATEGORY | ALIAS | FACTOR |
| Code Changes | cmtS | The number of git commits to src code files |
| Code Changes | cmtBld | The number of changes to build script, offer |
| Dependency Change | chg3rd | The number of changes of third party |
| Related Information | timeB | The executing time of each build block |
| Related Information | numP | The number of changes in targeted platforms/env |
| BVT features | freQ | The frequency of failed cases in BVT/FVT to block |
| Build Block Data Flow Features | numInput | The number of upstream blocks |
| Build Block Data Flow Features | numOutput | The number of downstream blocks |
| Build Block Data Flow Features | numTotal | The number of total input/output blocks |

- 620: Code Changes
- 625: Dependency Change
- 630: Related Information
- 635: BVT features
- 640: Build Block Data Flow Features
- 605, 610, 615

| BRV MODEL INPUT TABLE 650 | | | | | | | |
|---|---|---|---|---|---|---|---|
| cmtS | cmtBld | numInput | chg3rd | timeB | numP | freQ | Result |
| 98 | 7 | 3 | 20 | 30 | 3 | 35 | 1 |
| 66 | 9 | 2 | 8 | 60 | 1 | 80 | 0 |
| 23 | 34 | 4 | 8 | 12 | 2 | 20 | 1 |
| . | . | . | . | . | . | . | . |

| DEVOPS MODEL INPUT FEATURES 800 |||
| --- | --- | --- |
| CATEGORY | ALIAS | FACTOR |
| Risk Value | BlockID-RV | Risk value of each block |
| DevOps Data Flow Features | NumOut-RV | The multiplication between RV and the number of outputting blocks. The block that has more outputting blocks has an RV with highest impact to final risk. |
| | NumInput-RV | The multiplication between RV and the number of input blocks |
| | NumTotal-RV | The multiplication between RV and the number of input/output blocks |

DEPLOY BUILD BLOCKS AND ANALYZE BUILD BOTTLENECK

BACKGROUND

In software engineering, CI/CD is the combined practices of continuous integration (CI) and continuous delivery (CD). Continuous integration is a coding philosophy and set of practices that drive development teams to frequently implement small changes in code to version control repositories. Users require a mechanism to integrate and validate the code changes because modern applications typically require developing code using different platforms and tools. The technical goal of CI is to establish a consistent and automated approach to build, package, and test applications. With consistency in the integration process in place, users are more likely to commit code changes more frequently that, in turn, leads to better collaboration and software quality.

Continuous delivery picks up where continuous integration ends and automates application delivery to selected infrastructure environments. Users work with multiple environments such as a production environment, development environment, and test environments. CD ensures an automated approach to push code changes to the users operating in the different environments.

CI/CD tools also help store environment-specific parameters packaged with each delivery. CI/CD automation then performs necessary service calls to web servers, databases, and other services that may need to be restarted or follow other procedures when applications are deployed. Continuous integration and continuous delivery require continuous testing because the objective is to deliver quality applications and code to users. Continuous testing is often implemented as a set of automated regression, performance, and other tests that are executed in the CI/CD pipeline.

DevOps is a set of practices that combines software development (Dev) and IT operations (Ops). DevOps aims to shorten the systems development life cycle and provide continuous delivery with high software quality. Modern day DevOps practices involve continuous development, continuous testing, continuous integration, continuous deployment and continuous monitoring of software applications throughout its development life cycle. CI/CD bridges the gaps between development and operation activities and users by enforcing automation in building, testing and deployment of applications.

BRIEF SUMMARY

According to one embodiment of the present disclosure, an approach is provided in which the approach trains a first machine learning model using a set of features corresponding to a set of build blocks. The set of build blocks include at least one dependency build block and at least one artifact package build block. The approach predicts a set of risk values of the set of build blocks using the trained first machine learning model, and marks at least one of the build blocks as a bottleneck in response to comparing the set of risk values against a risk threshold.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

Figure 1:
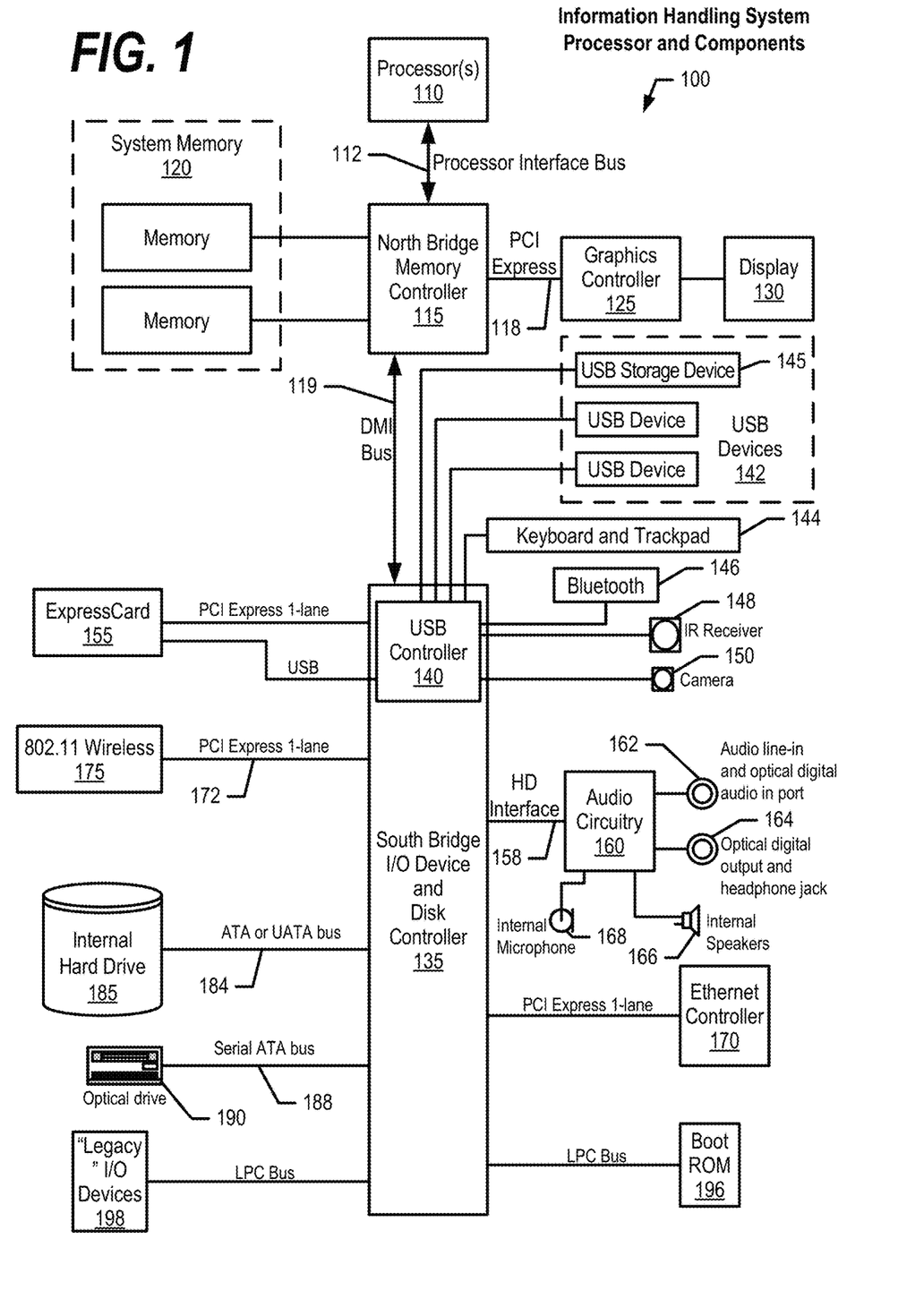
FIG. 1 is a block diagram of a data processing system in which the methods described herein can be implemented.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
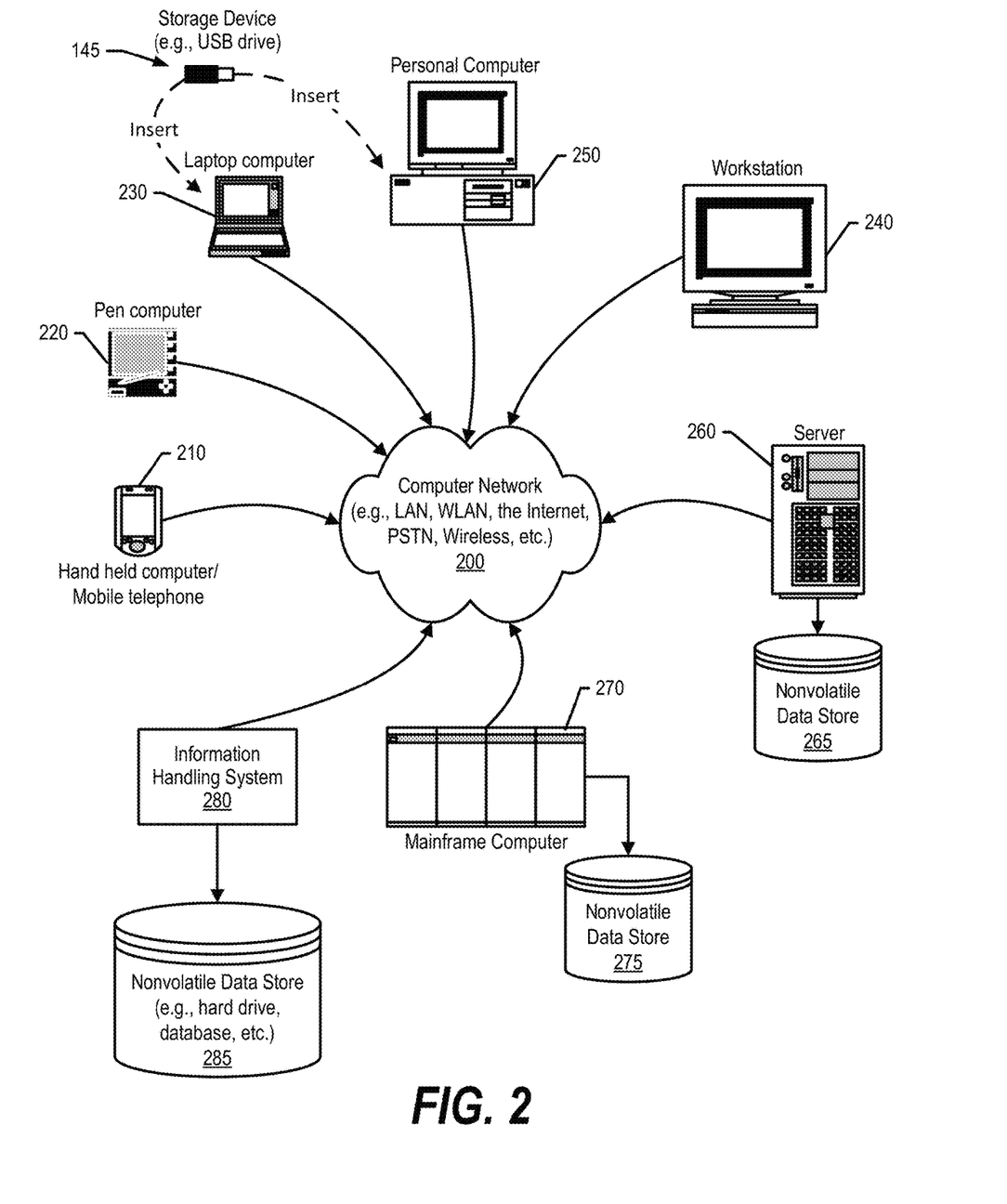
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, modern day DevOps practices involve continuous development, continuous testing, continuous integration, continuous deployment and continuous monitoring of software applications throughout their development life cycle. A challenge found, however, is that a large number of dependencies between dependencies and artifacts require substantial effort during deployment. Another challenge found is that users find difficulty in analyzing bottlenecks and their context in DevOps data flows, especially when the process is lengthy with a high risk of failure. Bottlenecks greatly impact the final result of DevOps and users attempt to locate and fix the bottlenecks based on complicated relationships to maintain the DevOps. Another challenge found is that users have difficulty in monitoring, measuring, and predicting risk values during DevOps execution.

FIGS. 3 through 10 depict an approach that can be executed on an information handling system that resolves the challenges discussed above by defining and deploying build blocks based on DevOps pipeline statistics and performing bottleneck analysis to measure and predict failure risks. The approach uses software modules that automatically generate the configuration of a build block's attributes and scripts that map to different target offers. In one embodiment, the approach trains two machine learning models where the first model analyzes bottlenecks by calculating a block risk value (BRV) of each block, and the second model measures/predicts an overall DevOps risk value (DRV). In this embodiment, the BRV model trains on the features of build blocks (including the number of input blocks), and predicts the risk value of each block to identify bottlenecks. Then, the DRV model trains on the risk value of each block and the portraits of data flow to predict the final risk value of the DevOps process.

As defined herein, a build block is i) a dependency (dependency build block) or ii) an artifact package build block, which includes an output artifact with its configuration and target offer. Build blocks are based on the CI/CD build process and/or 3rd party dependencies, which includes configuration files and their corresponding connections. In this embodiment, each build block may deliver ".jar", ".dll", or ".so" artifacts, and the code related with the artifacts is managed in their corresponding build block. A target offer is an offer selected and delivered when multiple offers exist, such as a target offer for a public cloud, private cloud, or a subscription. In one embodiment, the configuration includes code that pulls the required dependencies; compiles the source codes; packages the compiled code to the artifact; and deploys the artifact to a server, repository, or target delivery offer.

Figure 3:
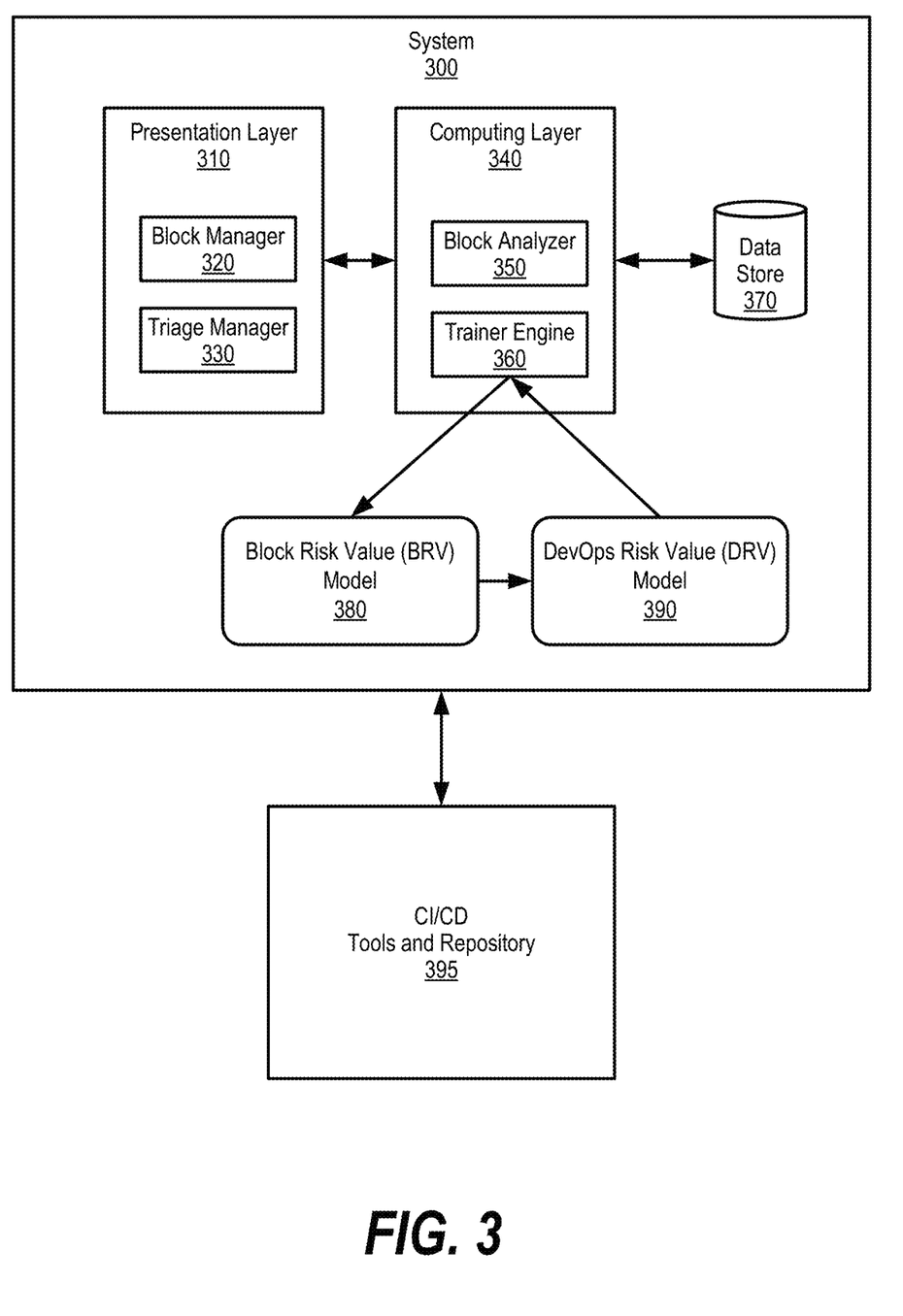
FIG. 3 is an exemplary diagram depicting a system that defines and deploys build blocks based on DevOps pipeline statistics and bottleneck analysis to measure and predict the risk of failures.

FIG. 3 is an exemplary diagram depicting a system that defines and deploys build blocks based on DevOps pipeline statistics and bottleneck analysis to measure and predict the risk of failures. System 300 executes in tandem with CI/CD tools and repository 395 and includes presentation layer 310 and computing layer 340. Presentation layer 310 includes block manager 320 and triage manager 330. Block manager 320 manages build blocks and links, such as creating, updating information, defining version numbers, group IDs, artifact IDs, etc. Triage manager 330 refines and seeks large numbers of build blocks. In one embodiment, the build blocks may be triaged by category, such as by platform, language, frontend/backend, branch and offer type, file type, etc. (see FIG. 5 and corresponding text for further details).

Computing layer 340 includes block analyzer 350 and trainer engine 360. Block analyzer 350 automatically generates auto-scripts and mappings to deploy the build blocks into target offers. Block analyzer 350 also calculates connections (data flow) between two build blocks and generates the data flow and stores the information in data store 370. In one embodiment, when a user creates a new build block and adds links, block analyzer 350 captures the user's input, converts its dependencies, and stores them in config files, such as a pom.xml file. In this embodiment, block analyzer 350 converts the links to the target offers and stores the offers in the pom.xml file. In another embodiment, block analyzer 350 extracts the dependencies and target offers for a user's existing pom.xml file and generates links between its related build blocks.

Figure 6:
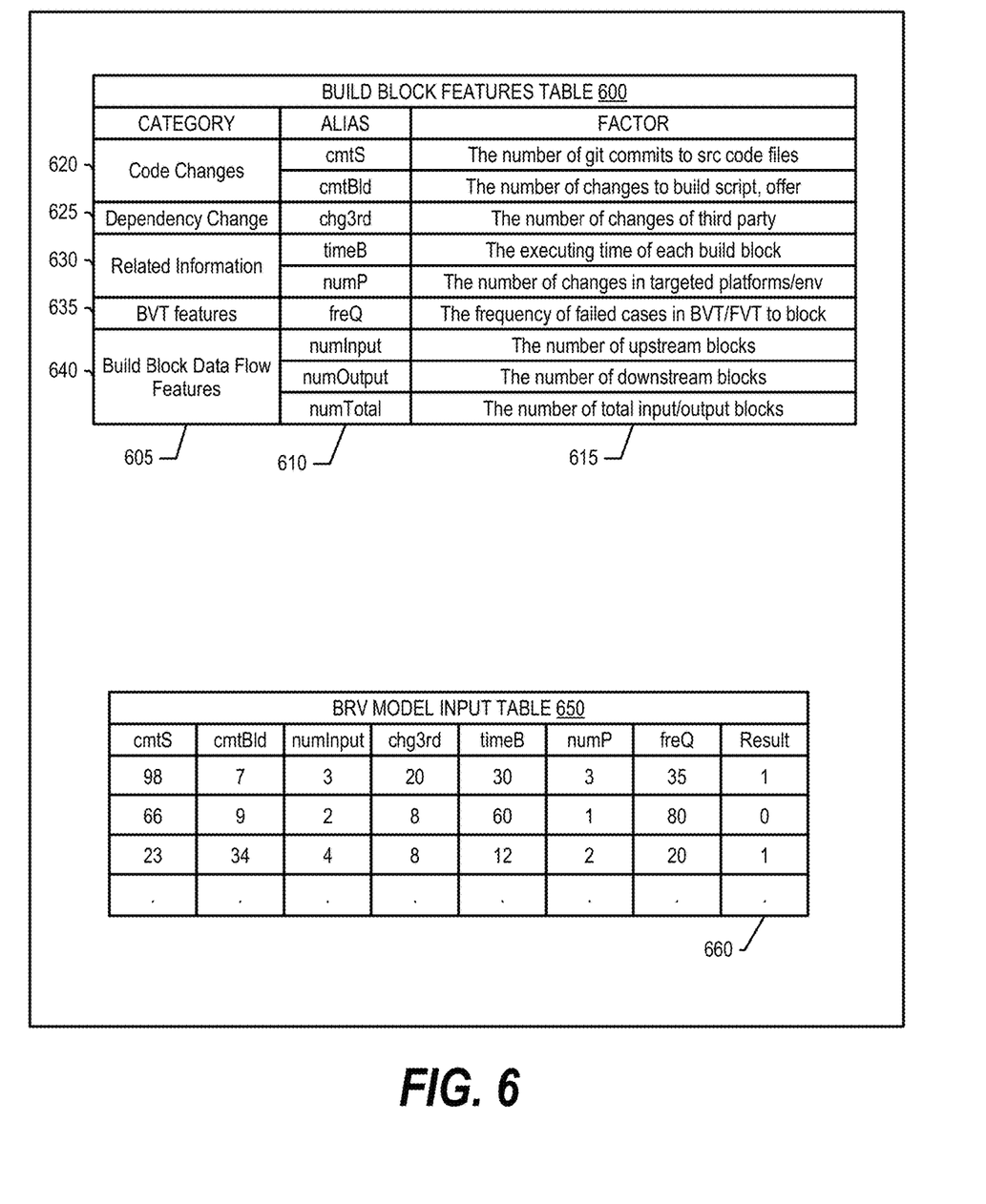
FIG. 6 is an exemplary diagram depicting a build block features table and a Block Risk Value (BRV) model input table.

Trainer engine 360 harvests input features of blocks and data flow to train Block Risk Value (BRV) model 380 and DevOps Risk Value (DRV) model 390. BRV model 380 predicts a risk value of each block. BRV model 380 extracts the features inside a build block and defines the features that impact the build block to failure. In one embodiment, as shown in FIG. 6, features such as the following impact the build block to failure:

cmtS: tracks the number of git commits to the source code files;
cmtBld: tracks the number of changes to the build scripts/offer;
chg3rd: tracks the number of changes from a third party;
timeB: the executing time of each build block;
numP: the number of changes in the targeted platforms/environment; and
freQ: tracks the frequency of failed cases in BVT/FVT the block.

In addition, new factors of features inside the data flow may also impact the build block to failure, such as:

numInput: tracks a number of upstream blocks;
numOutput: tracks a number of downstream blocks; and
numTotal: tracks the number of total input/output blocks.

DRV model 390 predicts the final risk value of the DevOps cycle. DRV model 390 extracts input features and trains a neural net, in one embodiment, using the extracted input features. Then, DRV model 390 identifies bottlenecks of the DevOps cycle (see FIGS. 4, 8 through 10, and corresponding text for further details). For example, if a user builds Java files and generates A.jar, which calls functions implemented in B.jar and C.jar, then B.jar and C.jar are the dependencies of A.jar. In this example, if B.jar has high risk to fail to generate, then it will likely make A.jar fail to deliver and B.jar is the bottleneck.

Figure 4:
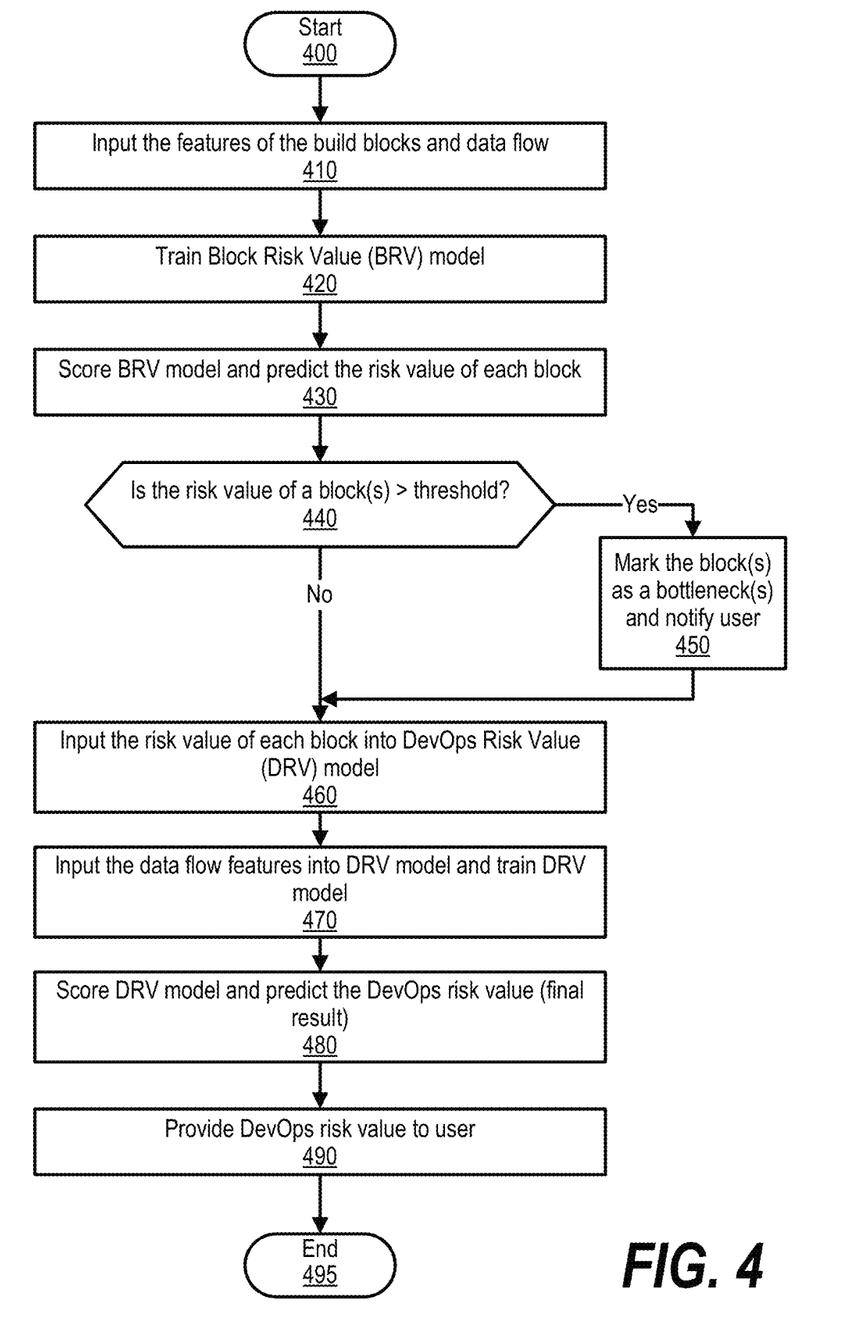
FIG. 4 is an exemplary flowchart depicting steps taken to train and utilize machine learning models to predict risk values and identify bottlenecks of a DevOps cycle.

FIG. 4 is an exemplary flowchart depicting steps taken to train and utilize machine learning models to predict risk values and identify bottlenecks of a DevOps cycle. FIG. 4 processing commences at 400 whereupon, at step 410, the process inputs the features of the build blocks and data flow. The build blocks (dependencies and artifact packages) are from an existing build process or third party dependencies. In one embodiment, the process retrieves code written during the DevOps coding cycle and segments the code into build blocks. In another embodiment, the dataflow information exists in the CI/CD flow.

At step 420, the process trains BRV model 380. In one embodiment, the process trains BRV model 380 using linear, neural net, C&RT, or other typical supervised learning approaches. In this embodiment, the training process uses inputs such as cmtS, cmtBld, numInput, chg3rd, timeB, numP and freQ (see FIG. 9 and corresponding text for further details). The process analyzes the data flow and extracts connection features, such as the number of input blocks. At step 430, the process scores BRV model 380 and outputs the risk value prediction of each block.

The process evaluates each build block and determines as to whether the risk value of one or more of the build blocks is greater than a risk threshold (decision 440). For example, a user may configure the risk threshold at 0.7. If the risk value of one or more of the blocks is greater than the risk threshold, then decision 440 branches to the 'yes' branch whereupon, at step 450, the process marks the build blocks having a risk value greater than the risk threshold as a bottleneck (see FIG. 7 and corresponding text for further details). The process then notifies the user of the bottlenecks. On the other hand, if none of the build blocks have a risk value greater than the risk threshold, then decision 440 branches to the 'no' branch bypassing step 450.

At step 460, the process inputs the risk value of each block into DRV model 390. At step 470, the process inputs the data flow features into DRV model 390 and trains DRV model 390 by inputting, in one embodiment, NumOut-RV, NumInput-RV and NumTotal-RV into DRV model 390.

At step 480, the process scores DRV model 390 and predicts the DevOps risk value (final result). At step 490, the process provides the DevOps risk value to the user. In one embodiment, the process compares the DevOps risk value against a threshold (e.g., 0.7) do determine whether to take action and/or adjust the threshold as needed. FIG. 4 processing thereafter ends at 495.

Figure 5:
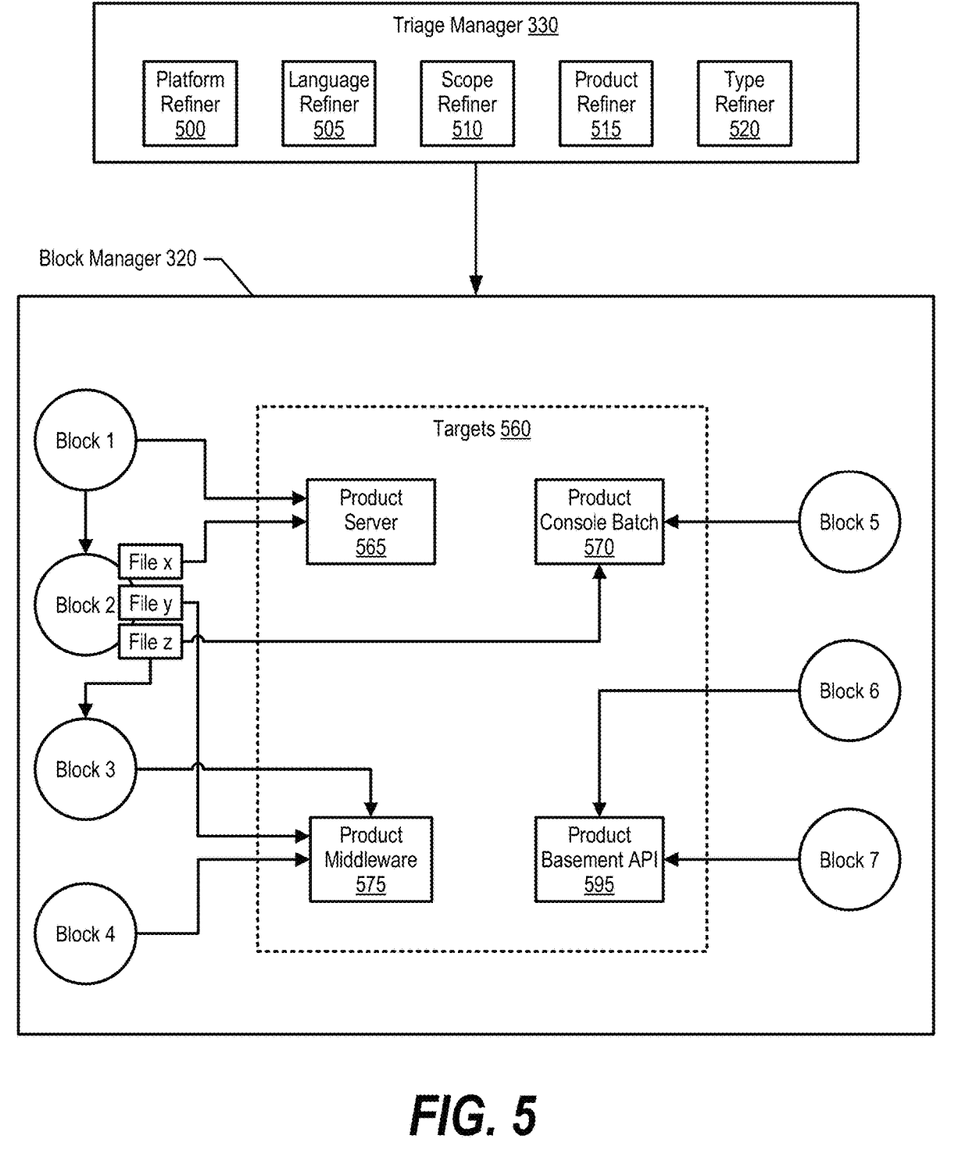
FIG. 5 is an exemplary diagram depicting a triage manager interacting with a block manager to refine and seek a large number of blocks.

FIG. 5 is an exemplary diagram depicting a triage manager interacting with a block manager to refine and seek a large number of blocks. In one embodiment, build blocks may be triaged by category such as platform, language, frontend/backend, and branch and offer name (e.g., public cloud, private cloud, subscription, desktop, etc.).

Block manager 320 manages the build blocks and their corresponding links, such as creating, updating information, defining version numbers, group IDs, artifact IDs and source repositories. FIG. 5 shows three different scenarios for block manager 320 to manage. The first scenario is a build block delivering to one target offer, such as block 3, block 4, block 5, block 6, and block 7. Block 3's target offer is product middleware 575. Block 4's target offer is product middleware 575. Block 5's target offer is product console batch 570. Block 6's target offer is product basement API 595. And, block 7's target offer is product basement API 595.

The second scenario is that dependencies in one build block deliver to target offers and also feed into a downstream build block, such as block 1. Block 1's target offer is product server 565 and also feeds into downstream build block 2. The third scenario is when a build block includes configure files that are used in a downstream build block and also deliver to different target offers, such as block 2 feeding file x to target offer product server, feeding file y to target offer product middleware, and feeding file z to downstream block 3.

Triage manager 330 refines/seeks a large numbers of blocks and triages the blocks, for example, by category. Triage manager 330 includes platform refiner 500 (e.g., refines Linux, Win, Mac); language refiner 505 (e.g., refines Python, Java, C++); scope refiner 510 (e.g., refines Frontend, Backend); product refiner 515 (e.g., refines Client, Server, Console); and type refiner 520 (e.g., refines jar, zip, tgz). For example, when language refiner 505 refines "Python", language refiner 505 searches Python related items and displays build blocks that include "python" in the GUI, and does not display build blocks that do not include "python" items in GUI.

FIG. 6 is an exemplary diagram depicting a build block features table and a BRV model input table. Build block features table 600 includes a list of various features in a build block. Column 605 includes a list of categories. Column 610 includes a list of feature aliases corresponding to the categories. And, column 615 includes a list of descriptions of the list of feature aliases.

Row 620 includes two code change features cmtS and cmtBld. CmtS tracks the number of git commits to the source code files. CmtBld tracks the number of changes to the build scripts/offer. Row 625 includes a dependency change feature chg3rd, which tracks the number of changes from a third party. Row 630 includes two related information features. TimeB is the executing time of each build block and numP is a number of changes in the targeted platforms/environment. Row 635 includes a BVT (Build Verification Test) feature. FreQ tracks the frequency of failed cases in BVT/FVT (Functional Verification Test) the block. Row 640 includes three dataflow features. NumInput tracks a number of upstream blocks; numOutput tracks a number of downstream blocks; and numTotal tracks the number of total input/output blocks.

BRV model input table 650 shows feature alias values and a result field (column 660). Result field 660 records a "1" if the build block runs to success (risk value lower than threshold) and records a "0" if the build block fails (risk value greater than threshold). In one embodiment, system 300 uses BRV model input table 550 to train BRV model 380 using a linear neural net (see FIG. 9 and corresponding text for further details).

Figure 7:
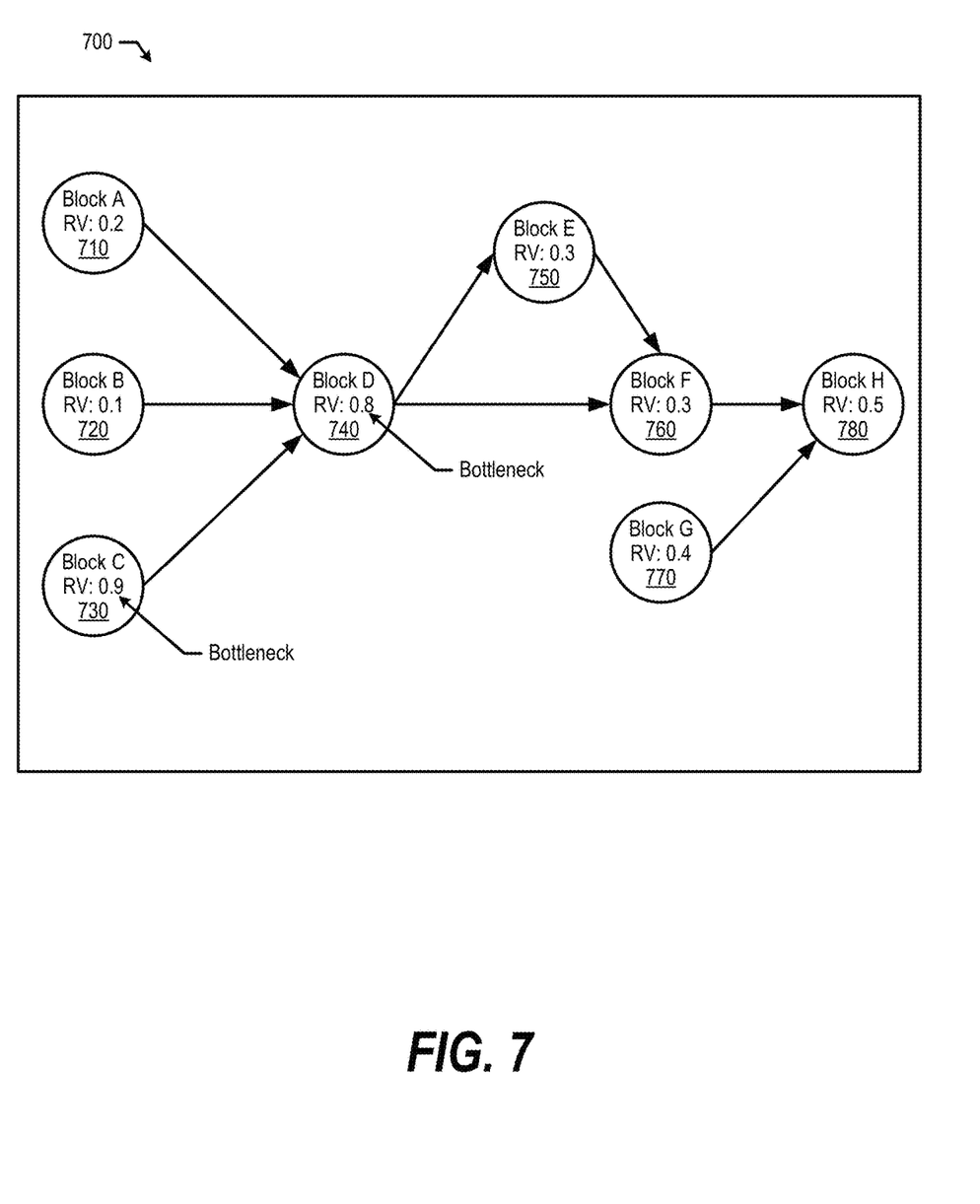
FIG. 7 is an exemplary diagram depicting a dataflow through build blocks and identified bottlenecks.

FIG. 7 is an exemplary diagram depicting a dataflow through build blocks and identified bottlenecks. Based on the training process discussed herein, system 300 monitors risk values of the various blocks to identify bottlenecks. System 300, in one embodiment, defines a risk threshold of 0.7 and determines that block C 730 and block D 740 are bottlenecks using BRV model 380. In turn, system 300 inputs the bottleneck information into DRV model 390 to measure the overall DevOps risk value.

In one embodiment, flow 700 is a useful tool for DevOps to monitor. For example, a user may set the threshold to 0.7 and if a build block's threshold is greater than 0.7, then the block is identified as a bottleneck. In another embodiment, system 300 marks the top "X" percent as the bottlenecks through the DevOps flow.

Figure 8:
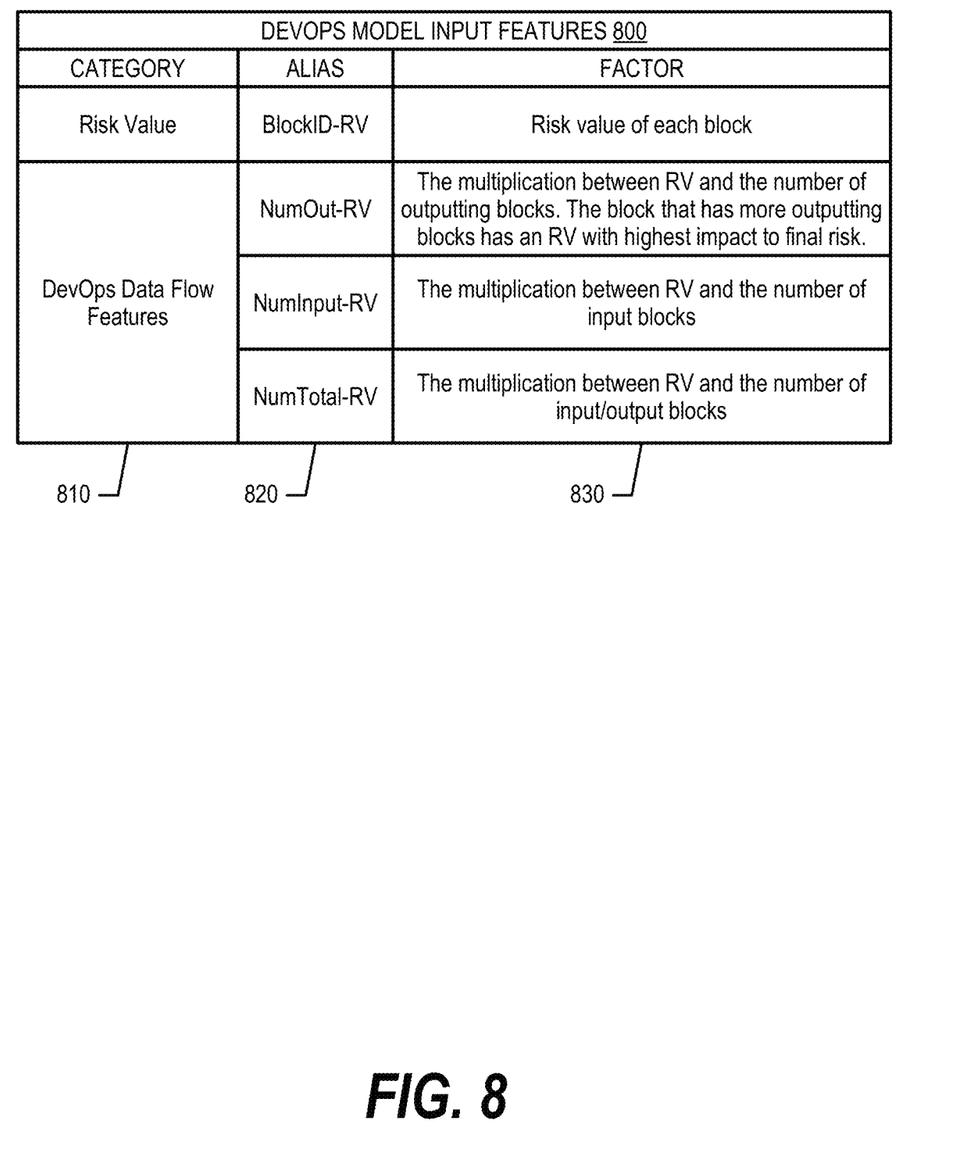
FIG. 8 is an exemplary diagram depicting a table of input features that are input into a DevOps Risk Value model for training.

FIG. 8 is an exemplary diagram depicting a table of input features that are input into DRV model 390 for training. DevOps model input features 800 include category column 810, alias column 820, and factor column 830. The risk value (RV) category includes block ID-RV, which is a risk value of each block. Data flow features category includes NumOut-RV, NumInput_RV, and NumTotal-RV. NumOut-RV is the multiplication between the risk value and the number of outputting blocks. In one embodiment, the block that has more outputting blocks has an increased impact of the final risk (DevOps risk value). NumInput-RV is the multiplication between the risk value and the number of input blocks. And, NumTotal-RV is the multiplication between the risk value and the number of input/output blocks.

Figure 9:
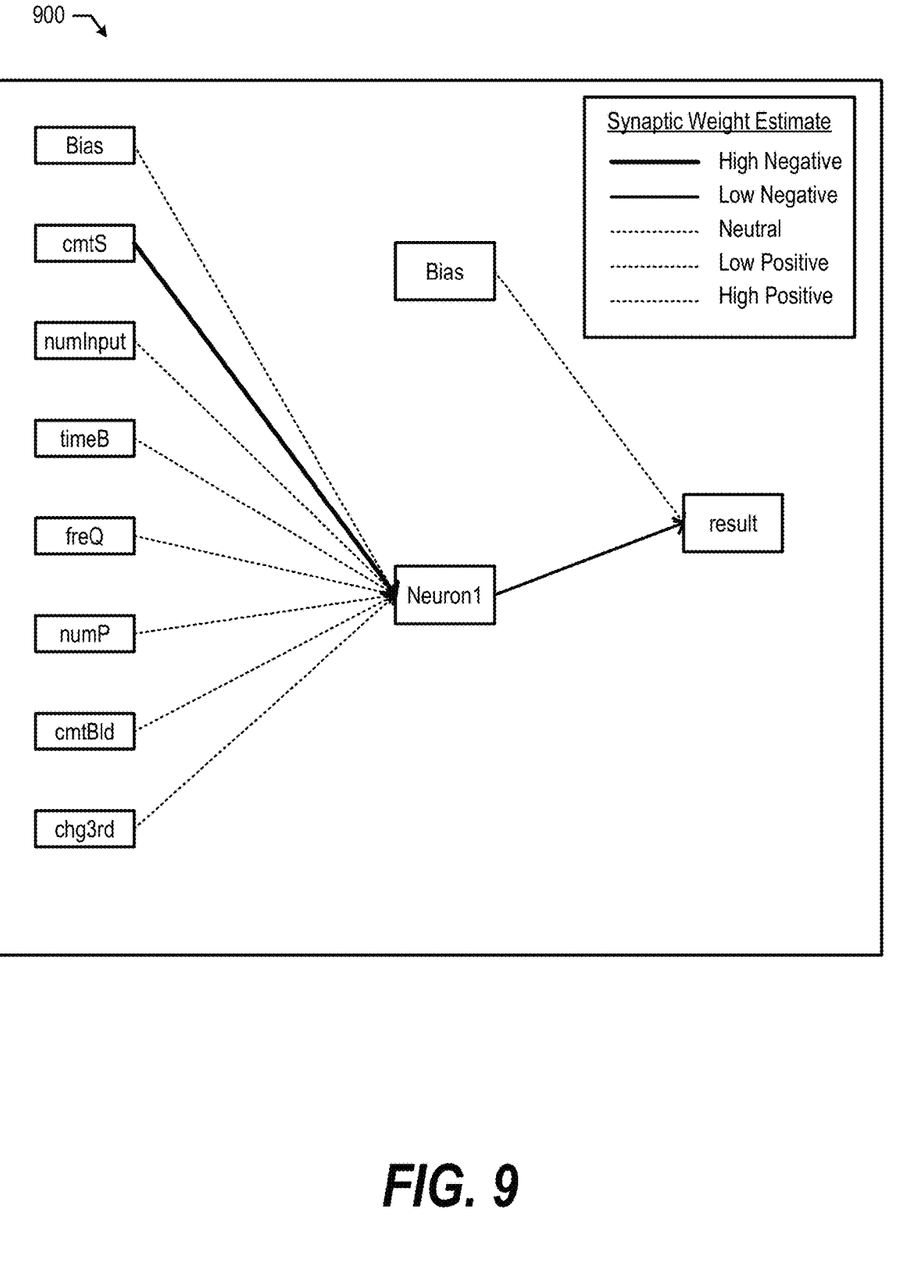
FIG. 9 is an exemplary diagram depicting a neural net representation of a BRV model after training.

FIG. 9 is an exemplary diagram depicting a neural net representation of BRV model 380 after training. Representation 900 shows that the dataflow between the cmtS feature and Neuron 1 has a high negative synaptic weight estimate for a particular build block and indicates a bottleneck. As discussed above, BRV model 380 may be trained using linear, neural net, C&RT, or other typical supervised learning approaches.

Figure 10:
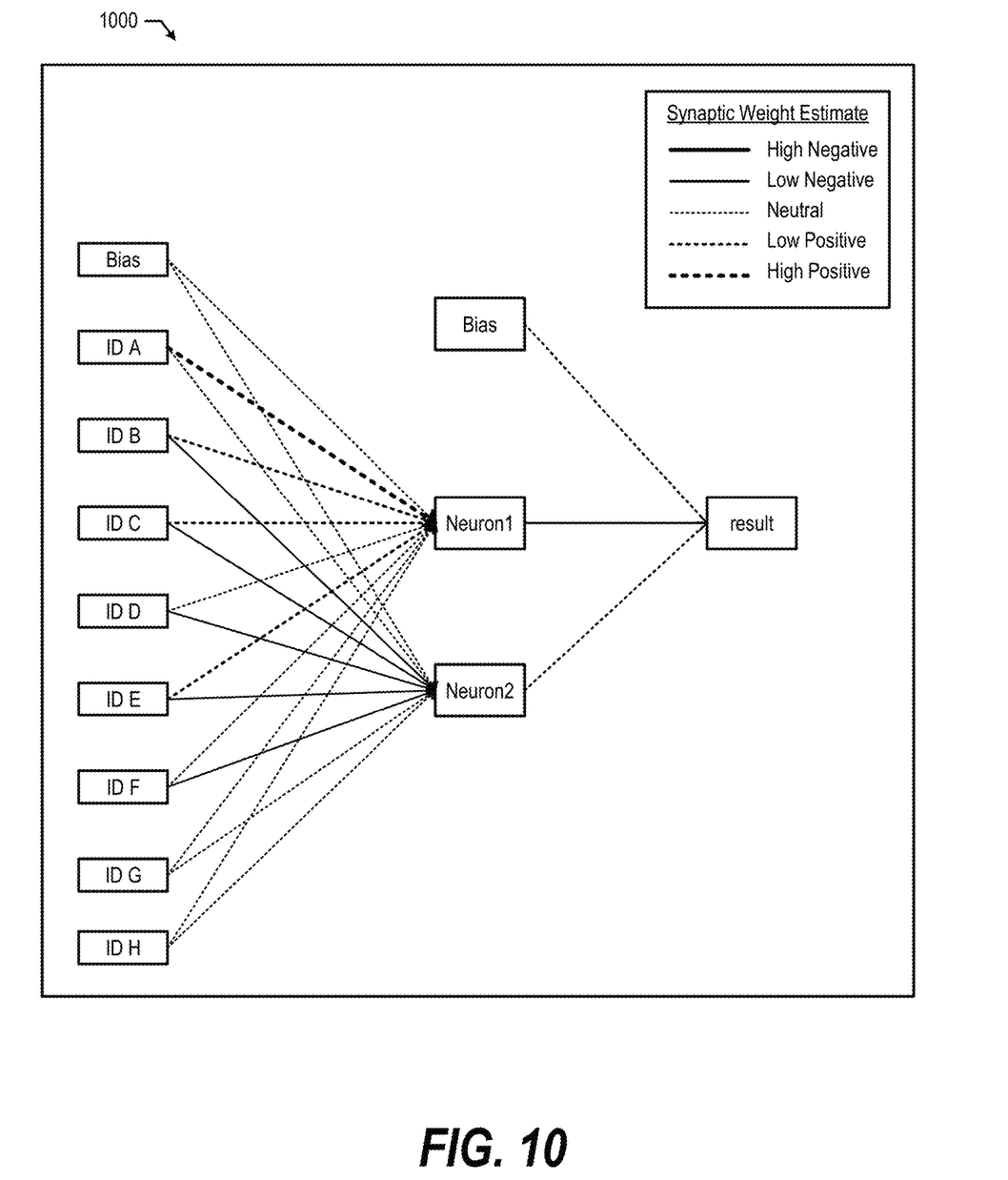
FIG. 10 is an exemplary diagram depicting a neural net representation in response to training a DRV model.

FIG. 10 is an exemplary diagram depicting a neural net representation in response to training DRV model 390.

Representation 1000 shows a final risk value the DevOps data flow, which indicates no high negative synaptic weight estimates and therefore the DevOps dataflow does not currently have bottlenecks. As discussed above, different types of supervised learning approaches may be used to predict the final DevOps risk value other than through neural net representations.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A computer-implemented method implemented by an information handling system that includes a memory and a processor, the method comprising:
    training a first machine learning model using a set of features corresponding to a set of build blocks, wherein the set of build blocks comprise at least one dependency build block and at least one artifact package build block;
    predicting a set of risk values of the set of build blocks using the trained first machine learning model, wherein at least one risk value included in the set of risk values is generated, by the trained first machine learning model, in response to inputting an amount of code changes and an amount of dependency changes corresponding to a first build block selected from the set of build blocks; and
    marking at least one build block in the set of build blocks as a bottleneck in response to comparing the set of risk values against a risk threshold.

2. The computer-implemented method of claim 1 further comprising:
    training a second machine learning model using the set of risk values;
    computing, by the second machine learning model, an overall risk value of a DevOps cycle comprising each of the set of build blocks; and
    providing the overall risk value to a user.

3. The computer-implemented method of claim 2 wherein, for each of the set of build blocks, the set of features comprises a number of upstream build blocks and a number of downstream build blocks.

4. The computer-implemented method of claim 3 wherein the predicting of the set of risk values further comprises:
    inputting, to the first machine learning model, the number of upstream build blocks corresponding to the first build block, and the number of downstream build blocks corresponding to the first build block.

5. The computer-implemented method of claim 4 wherein the computing of the overall risk value of the DevOps cycle further comprises:
    computing a downstream impact value of the first build block by multiplying the first risk value by the number of downstream build blocks of the first build block;
    computing an upstream impact value of the first build block by multiplying the first risk value by the number of upstream build blocks of the first build block; and
    inputting the first risk value, the downstream impact value, and the upstream impact value into the second machine learning model.

6. The computer-implemented method of claim 1 further comprising:
    triaging the set of build blocks based on a category selected from the group consisting of a platform category, a language category, a scope category, a product category, and a type category.

7. The computer-implemented method of claim 1 wherein the artifact package comprises an output artifact, a configuration, and a target offer, the method further comprising:
    automatically generating the configuration of the first build block to map to the target offer of the first build block.

8. An information handling system comprising:
    one or more processors;
    a memory coupled to at least one of the processors;
    a set of computer program instructions stored in the memory and executed by at least one of the processors in order to perform actions of:
        training a first machine learning model using a set of features corresponding to a set of build blocks, wherein the set of build blocks comprise at least one dependency build block and at least one artifact package build block;
        predicting a set of risk values of the set of build blocks using the trained first machine learning model, wherein at least one risk value included in the set of risk values is generated, by the trained first machine learning model, in response to inputting an amount of code changes and an amount of dependency changes corresponding to a first build block selected from the set of build blocks; and
        marking at least one build block in the set of build blocks as a bottleneck in response to comparing the set of risk values against a risk threshold.

9. The information handling system of claim 8 wherein the processors perform additional actions comprising:
    training a second machine learning model using the set of risk values;
    computing, by the second machine learning model, an overall risk value of a DevOps cycle comprising each of the set of build blocks; and
    providing the overall risk value to a user.

10. The information handling system of claim 9 wherein, for each of the set of build blocks, the set of features comprises a number of upstream build blocks and a number of downstream build blocks.

11. The information handling system of claim 10 wherein the processors perform additional actions comprising:
    inputting, to the first machine learning model, the number of upstream build blocks corresponding to the first build block, and the number of downstream build blocks corresponding to the first build block.

12. The information handling system of claim 11 wherein the processors perform additional actions comprising:
computing a downstream impact value of the first build block by multiplying the first risk value by the number of downstream build blocks of the first build block;
computing an upstream impact value of the first build block by multiplying the first risk value by the number of upstream build blocks of the first build block; and
inputting the first risk value, the downstream impact value, and the upstream impact value into the second machine learning model.

13. The information handling system of claim 8 wherein the processors perform additional actions comprising:
triaging the set of build blocks based on a category selected from the group consisting of a platform category, a language category, a scope category, a product category, and a type category.

14. The information handling system of claim 8 wherein the artifact package comprises an output artifact, a configuration, and a target offer, and wherein the processors perform additional actions comprising:
automatically generating the configuration of the first build block to map to the target offer of the first build block.

15. A computer program product stored in a computer readable storage medium, comprising computer program code that, when executed by an information handling system, causes the information handling system to perform actions comprising:
training a first machine learning model using a set of features corresponding to a set of build blocks, wherein the set of build blocks comprise at least one dependency build block and at least one artifact package build block;
predicting a set of risk values of the set of build blocks using the trained first machine learning model, wherein at least one risk value included in the set of risk values is generated, by the trained first machine learning model, in response to inputting an amount of code changes and an amount of dependency changes corresponding to a first build block selected from the set of build blocks; and
marking at least one build block in the set of build blocks as a bottleneck in response to comparing the set of risk values against a risk threshold.

16. The computer program product of claim 15 wherein the information handling system performs further actions comprising:
training a second machine learning model using the set of risk values;
computing, by the second machine learning model, an overall risk value of a DevOps cycle comprising each of the set of build blocks; and
providing the overall risk value to a user.

17. The computer program product of claim 16, for each of the set of build blocks, the set of features comprises a number of upstream build blocks and a number of downstream build blocks.

18. The computer program product of claim 17 wherein the information handling system performs further actions comprising:
inputting, to the first machine learning model, the number of upstream build blocks corresponding to the first build block, and the number of downstream build blocks corresponding to the first build block.

19. The computer program product of claim 18 wherein the information handling system performs further actions comprising:
computing a downstream impact value of the first build block by multiplying the first risk value by the number of downstream build blocks of the first build block;
computing an upstream impact value of the first build block by multiplying the first risk value by the number of upstream build blocks of the first build block; and
inputting the first risk value, the downstream impact value, and the upstream impact value into the second machine learning model.

20. The computer program product of claim 15 wherein the information handling system performs further actions comprising:
triaging the set of build blocks based on a category selected from the group consisting of a platform category, a language category, a scope category, a product category, and a type category.

* * * * *